(12) United States Patent
Gabalski et al.

(10) Patent No.: US 10,562,417 B2
(45) Date of Patent: Feb. 18, 2020

(54) RECLINING SEAT ASSEMBLY HAVING TENSION REACTING MEMBER

(71) Applicant: FORD GLOBAL TECHNOLOGIES, LLC, Dearborn, MI (US)

(72) Inventors: Jeffrey Gabalski, West Bloomfield, MI (US); Jung Jeon, South Lyon, MI (US); Joseph Michael Kish, Canton, MI (US); Macit Aktas, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 282 days.

(21) Appl. No.: 15/471,018

(22) Filed: Mar. 28, 2017

(65) Prior Publication Data

US 2018/0281633 A1 Oct. 4, 2018

(51) Int. Cl.
*B60N 2/22* (2006.01)
*B60N 2/68* (2006.01)
*B60N 2/02* (2006.01)

(52) U.S. Cl.
CPC ........... *B60N 2/2213* (2013.01); *B60N 2/688* (2013.01); *B60N 2002/0236* (2013.01)

(58) Field of Classification Search
CPC .. B60N 2/2213; B60N 2/682; B60N 2205/50; B60N 2/22; B60N 2/2362; B60N 2/688; B60N 2002/0236
USPC ....... 297/354.12, 297, 354.1, 367 R, 362.11, 297/362.12, 362.14
See application file for complete search history.

(56) References Cited

U.S. PATENT DOCUMENTS

| 2,667,916 | A | | 4/1948 | Burd | |
|---|---|---|---|---|---|
| 3,258,259 | A | | 6/1966 | Bohlin | |
| 4,065,182 | A | | 12/1977 | Braniff et al. | |
| 4,986,514 | A | * | 1/1991 | Ikegaya | B60N 2/2213 297/330 |
| 5,769,499 | A | | 6/1998 | Dudash et al. | |
| 5,871,195 | A | | 2/1999 | Gauger | |
| 5,967,611 | A | * | 10/1999 | York | B60N 2/2213 297/367 R |
| 5,984,419 | A | * | 11/1999 | Partington | B60N 2/0232 297/216.13 |
| 6,045,186 | A | | 4/2000 | Butt et al. | |

(Continued)

FOREIGN PATENT DOCUMENTS

DE 10 2009 051 120 5/2011

*Primary Examiner* — Theodore V Adamos
(74) *Attorney, Agent, or Firm* — Vichit Chea Price Heneveld LLP (57) ABSTRACT

A reclining seat assembly comprises a lower seating structure having an inboard side and an outboard side and a seatback pivotally affixed to the lower seating structure, the seatback having an inboard side and an outboard side. A gear system operatively couples one of the inboard side or the outboard side of the seatback to the corresponding inboard side or outboard side of the lower seating structure. The gear system operatively rotates the seatback relative to the lower seating structure. An actuator is coupled to the gear system to move the seatback between angular positions. A metal rod extends between the inboard side and outboard side of the seatback and has an inboard end and an outboard end. A threaded fastener assembly operably couples the inboard end and the outboard end of the metal rod to the inboard side and the outboard side of the seatback.

18 Claims, 6 Drawing Sheets

(56) References Cited

U.S. PATENT DOCUMENTS

| | | | | |
|---|---|---|---|---|
| 6,328,382 B1* | 12/2001 | Yamashita | ............. | B60N 2/236 |
| | | | | 297/367 R |
| 7,644,982 B2 | 1/2010 | Paluch | | |
| 7,673,943 B2* | 3/2010 | Ohta | .................... | B60N 2/0232 |
| | | | | 297/362.11 |
| 7,695,068 B2* | 4/2010 | Maeda | ................. | B60N 2/0232 |
| | | | | 297/362.11 |
| 7,976,103 B2 | 4/2011 | Gamache et al. | | |
| 7,992,938 B2* | 8/2011 | Kojima | ................. | B60N 2/236 |
| | | | | 297/354.12 |
| 8,052,215 B2* | 11/2011 | Ito | ........................ | B60N 2/0232 |
| | | | | 297/354.12 |
| 8,434,823 B2 | 5/2013 | Du et al. | | |
| 8,449,012 B2 | 5/2013 | Siebold et al. | | |
| 9,302,598 B2* | 4/2016 | Nihonmatsu | .......... | B60N 2/225 |
| 2011/0012413 A1* | 1/2011 | Du | ...................... | B60N 2/2252 |
| | | | | 297/362 |

* cited by examiner

RECLINING SEAT ASSEMBLY HAVING TENSION REACTING MEMBER

FIELD OF THE INVENTION

The present invention generally relates to reclining seat assemblies, and more particularly, to a reclining seating assembly having a tension reacting member to maintain seatback structural integrity.

BACKGROUND OF THE INVENTION

Motor vehicles are often provided with a pair of forward facing seating assemblies in the front row seat seating positions, each of which is typically provided with a lower seating structure and a seatback. Each of the pair of forward facing seating structures is typically mounted on either side of the longitudinal axis of the motor vehicle and often separated by a center console. Such seating assemblies are also commonly provided with a reclining seatback on which a retractable shoulder belt of the seat belt assembly is mounted at the outboard corner thereof. Alternatively, the outboard corner of the seatback may be provided with a slidable attachment point for a shoulder belt of the seatbelt assembly mounted elsewhere in the occupant compartment of the motor vehicle proximate the seating assembly. In either case, during a frontal impact event, the outboard corner of the reclining seatback may experience significant loading and torque as the occupant of the motor vehicle is urged forward against the shoulder belt.

Such loading can result in deformation of the seating assembly frame to such an extent that the seatback of the seating assembly frame of each of the side-by-side forward facing seating assemblies may potentially no longer remain in the same plane and become displaced laterally toward or away from one another, such that one or both of the seatbacks of the forward facing seating assemblies is out of the design position. Further, the lower portions of the inboard side and outboard side of the seatback of the seating assembly frame may experience deformation resulting in undesired lateral separation of the inboard side relative the outboard side of the seatback of the seating assembly frame. This can lead to unpredictable loading and performance of the seating assembly and perhaps erratic head, thorax, and femur loads experienced by the motor vehicle occupant during the impact event. Thus, a seating assembly frame less likely to suffer such deformation is desired.

SUMMARY OF THE INVENTION

According to one aspect of the present invention, a seat assembly comprises a lower seat, a seatback pivotally coupled to the lower seat, a gear system operatively coupling the seatback to the lower seating structure to rotate the seatback relative to the lower seat, a tension reacting member extending between an inboard side and an outboard side of the seatback, and a fastener assembly operably coupling the tension reacting member to each of the inboard side and the outboard side of the seatback.

Embodiments of the first aspect of the invention can include any one or a combination of the following features:
- a tension reacting member being a solid metal rod;
- a solid metal rod having a substantially continuous cross-sectional area;
- a fastener assembly comprising a threaded orifice disposed at each end of the solid metal rod and one of a pair of threaded bolts extending through an opening in each of the inboard side and the outboard side of the seatback and threadingly received within the threaded orifice;
- a fastener assembly comprising a threaded stud disposed at each end of the solid rod and extending through one of a pair of openings in each of the inboard side and the outboard side of the seatback and a threaded nut operatively coupled with the threaded stud;
- a fastener assembly comprising one of a bolt or a threaded stud extending through an opening in each of the inboard side and the outboard side of the seatback and a loadbearing washer through which the bolt or the threaded stud extends;
- a lower seat comprising an inboard side and an outboard side, the inboard side of the lower seat being spaced apart from the outboard side of the lower seat, and each of the inboard side and outboard side of the lower seat further comprises an upwardly extending mounting bracket;
- an inboard side of the seatback being spaced apart from the outboard side of the seatback, and each of the inboard side and outboard side of the seatback further comprising a downwardly extending mounting bracket;
- an actuator coupled to the gear system to move the seatback between a plurality of angular positions;
- a recliner hub operably coupled with the gear system, wherein the gear system is fixedly mounted to one of the downwardly extending brackets of the seatback;
- a recliner hub operably coupled with the gear system, wherein the gear system is fixedly mounted to one of the upwardly extending brackets of lower seating structure;
- a pair of gear systems each operably coupled with one of the inboard side or outboard side of the seatback;
- a pair of gear systems each operably coupled with one of the inboard side or outboard side of the lower seating structure; and
- a solid metal rod comprising a splined torque rod extending across the seat assembly and engaging an eccentric pivot on the side opposite the side operably coupled with the single gear system.

According to another aspect of the present invention, a seat assembly frame comprises a lower seat having an inboard side and an outboard side, the inboard side of the lower seat being spaced apart from the outboard side of the lower seat, and each of the inboard side and outboard side of the lower seat further comprises a pair of upwardly extending mounting brackets. A seatback is pivotally and operably coupled to the lower seat and comprises an inboard side and an outboard side, the inboard side of the seatback being spaced apart from the outboard side of the seatback. Each of the inboard side and outboard side of the seatback further comprises a pair of downwardly extending mounting brackets. A gear system is fixedly mounted to one of the pair of upwardly extending mounting brackets or one of the pair of downwardly extending mounting brackets to operatively couple the seatback to the lower seat to rotate the seatback relative to the lower seat. A solid metal rod extends between the inboard side and the outboard side of the seatback, the rod having an inboard end and an outboard end. A threaded fastener assembly operably coupling each of the inboard end and the outboard end of the solid metal rod to one of the pair of upwardly extending mounting brackets.

According to a further aspect of the present invention, a reclining seat assembly comprises a lower seating structure having an inboard side and an outboard side and a seatback pivotally affixed to the lower seating structure, the seatback having an inboard side and an outboard side. A gear system operatively couples one of the inboard side or the outboard side of the seatback to the corresponding inboard side or outboard side of the lower seating structure. The gear system operatively rotates the seatback relative to the lower seating structure. An actuator is coupled to the gear system to move the seatback between angular positions. A tension reacting member extends between the inboard side and outboard side of the seatback and has an inboard end and an outboard end. A threaded fastener assembly operably couples the inboard end and the outboard end of the tension reacting member to the inboard side and the outboard side of the seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
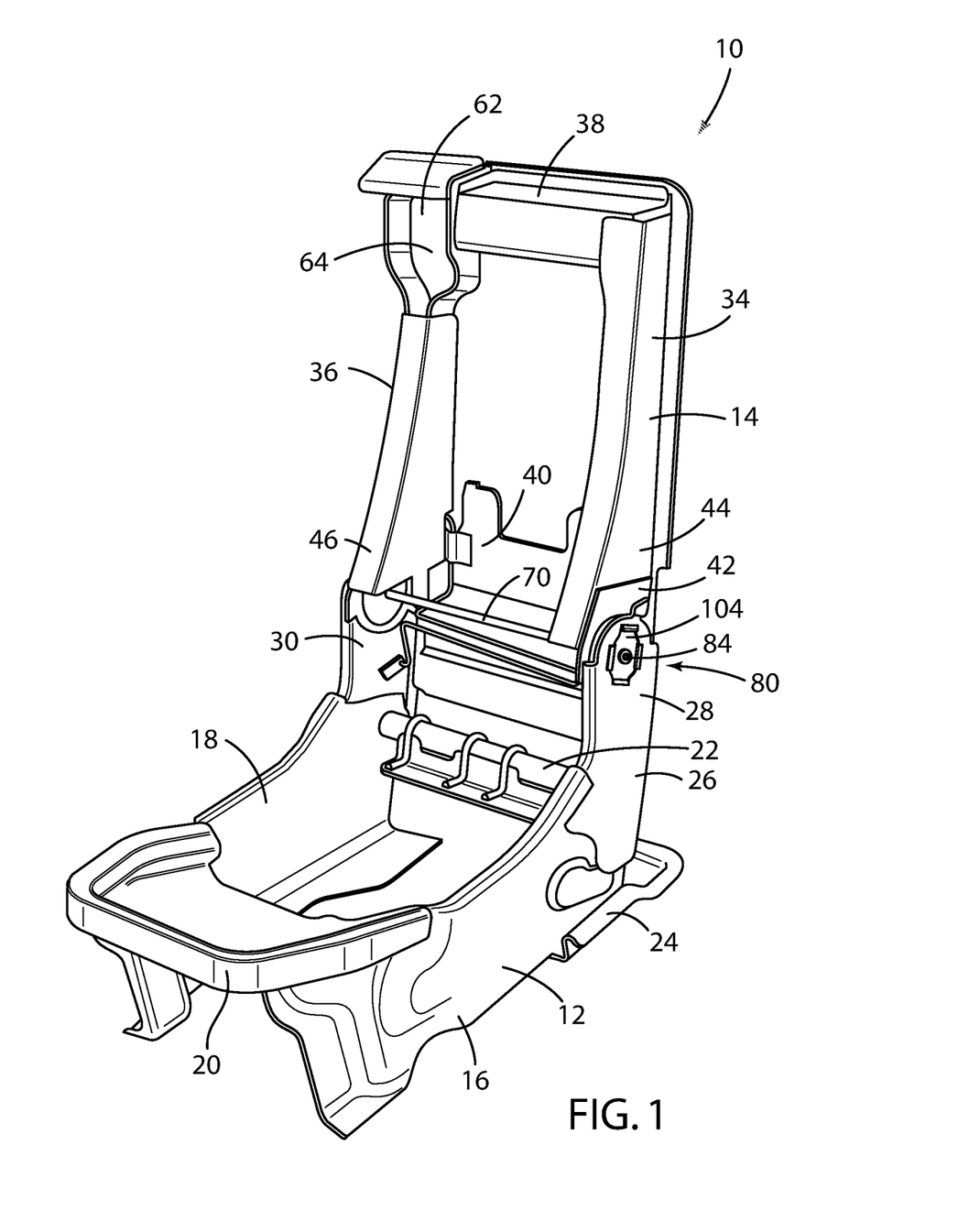
FIG. 1 is a perspective front view of a seating assembly frame of a motor vehicle in accordance with the present disclosure.
Figure 2:
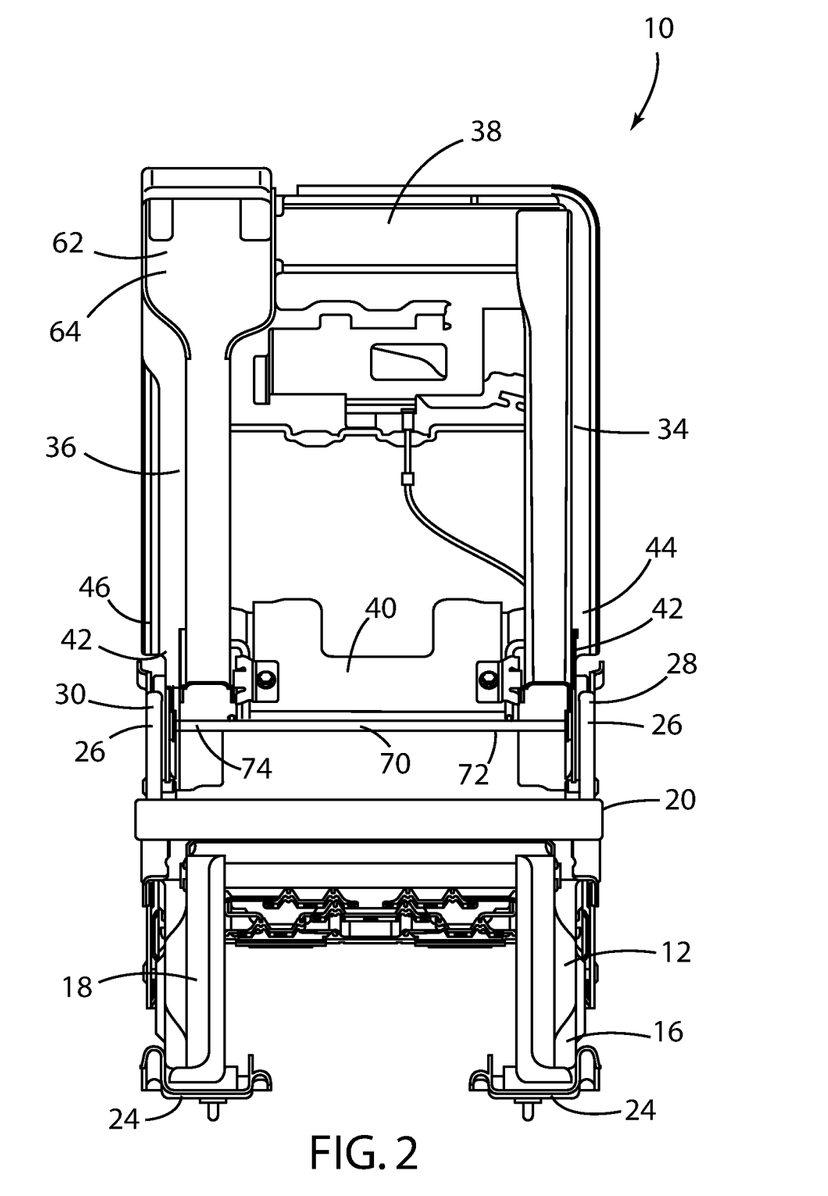
FIG. 2 is a front view of the seating assembly frame of a motor vehicle of FIG. 1 in accordance with the present disclosure.
Figure 3:
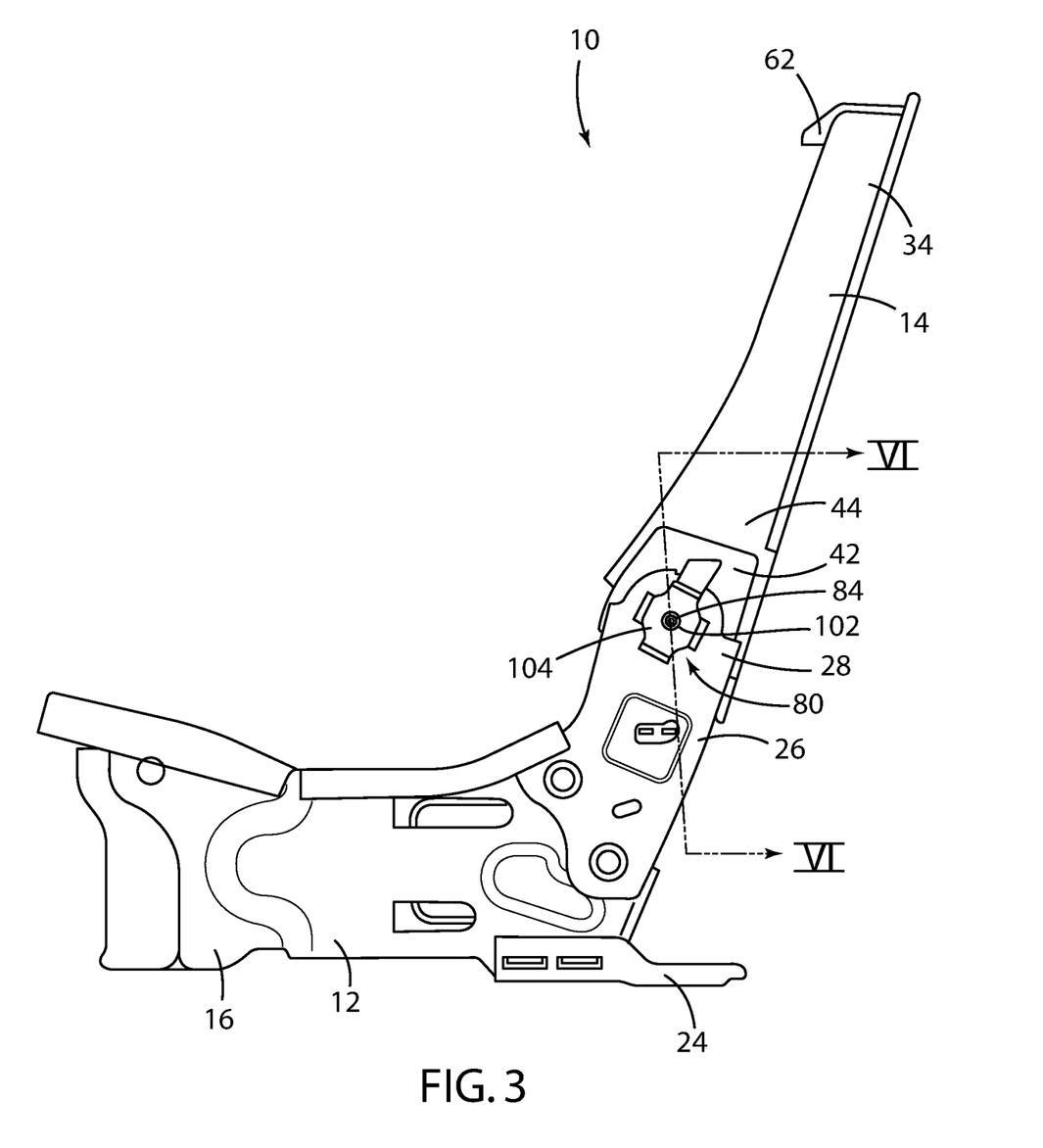
FIG. 3 is a side view of the seating assembly frame of a motor vehicle of FIG. 1 in accordance with the present disclosure.
Figure 4:
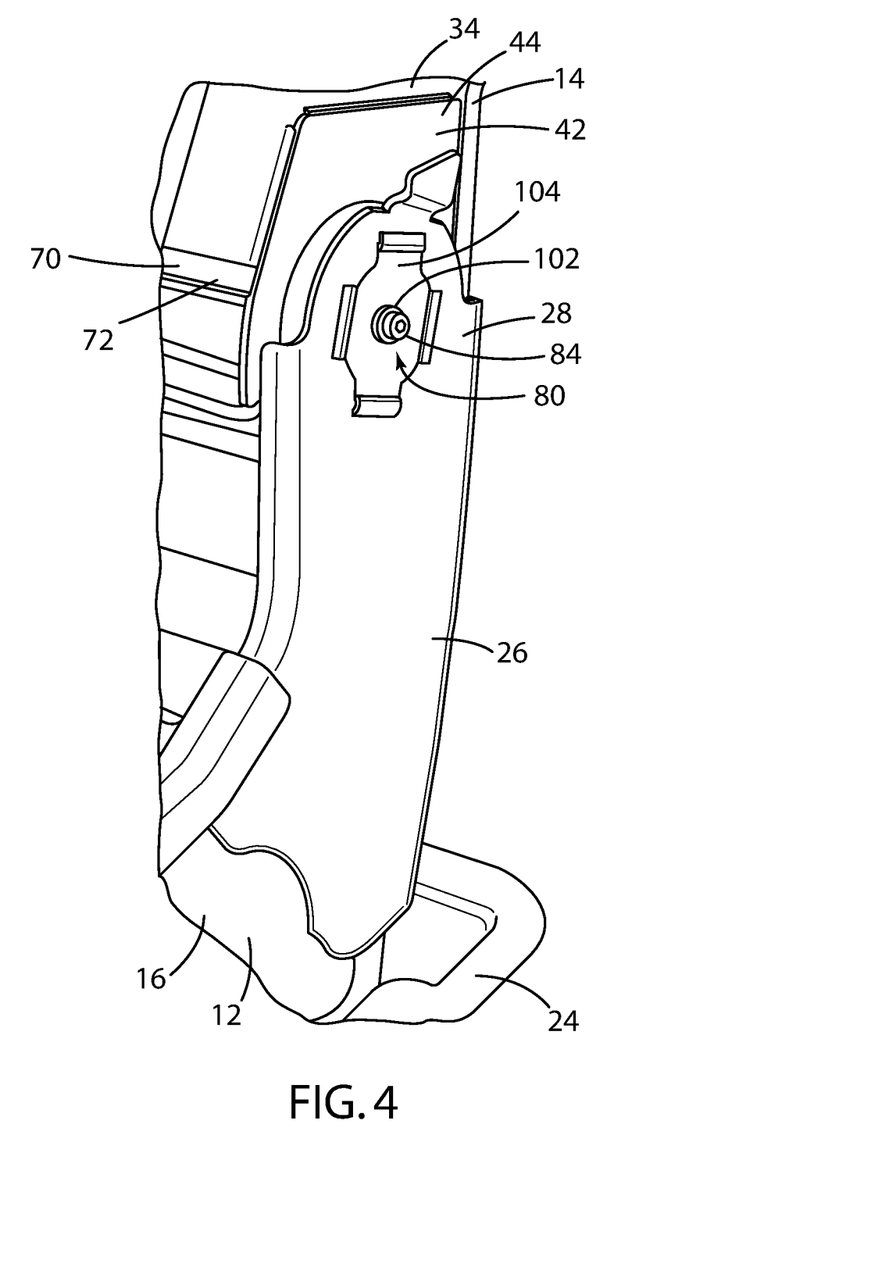
FIG. 4 is a perspective front view of a portion of the seating assembly frame of a motor vehicle of FIG. 1 in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, reference numeral 10 generally designates a frame for a motor vehicle seating assembly (not shown). As is typical of such seating assemblies, the seating assembly frame 10 includes a lower seating structure 12 and a seatback 14. In accordance with the present disclosure, the seatback 14 is designed to recline in the rearward direction to provide support for the back of the motor vehicle occupant in various positions between a fully upright position and a fully reclined or supine position. It is further contemplated that the seatback 14 may be pivoted forward, for example, in the event that entrance and egress access to a second row seating assembly is required.

As is well known, the seating assembly frame 10 may be mounted within a passenger compartment of an automotive vehicle (not shown). The seating assembly frame 10 is preferably fabricated from high tensile strength steel and may be implemented in a variety of ways. For example, the seating assembly frame 10 may utilize a seatback 14 that rotates 10 degrees or a seatback 14 that rotates 180 degrees. Though various components of the seating assembly frame 10 are depicted on particular sides of the seating assembly frame 10, it is to be understood that FIGS. 1-6 are merely exemplary and, therefore, non-limiting. Components of the seating assembly frame 10 may be manufactured in a reflective inboard/outboard configuration depending on packaging constraints, placement within the vehicle, passenger controls, and the like.

Referring now to FIG. 1, the seating assembly frame 10 shown includes the lower seating structure 12, which has an inboard side 16 and an outboard side 18, the outboard side 18 being spaced apart from the inboard side 16. The lower seating structure 12 further includes a front seating pan 20 and a rear cross member 22, to which may be attached a suspension system (not shown) for the lower seating structure 12 that would extend from the front seating pan 20 to the rear cross member 22, as is known. Such a suspension system may be fixed or adjustable. The lower seating structure 12 may be secured to one or more vehicle body structures (not shown), as is known in the art. That is, the lower seating structure of the seating assembly frame can be mounted to a track assembly 24, which may in turn be mounted to the floorboard (not shown) of the motor vehicle. Each of the inboard side 16 and outboard side 18 of the lower seating structure 12 has a bottom bracket 26 extending upwardly that forms a first and a second lower seating structure mount 28, 30, respectively. The bottom brackets 26 may be attached to the inboard side 16 and outboard side 18 of the lower seating structure 12 via fasteners or welding.

Figure 5:
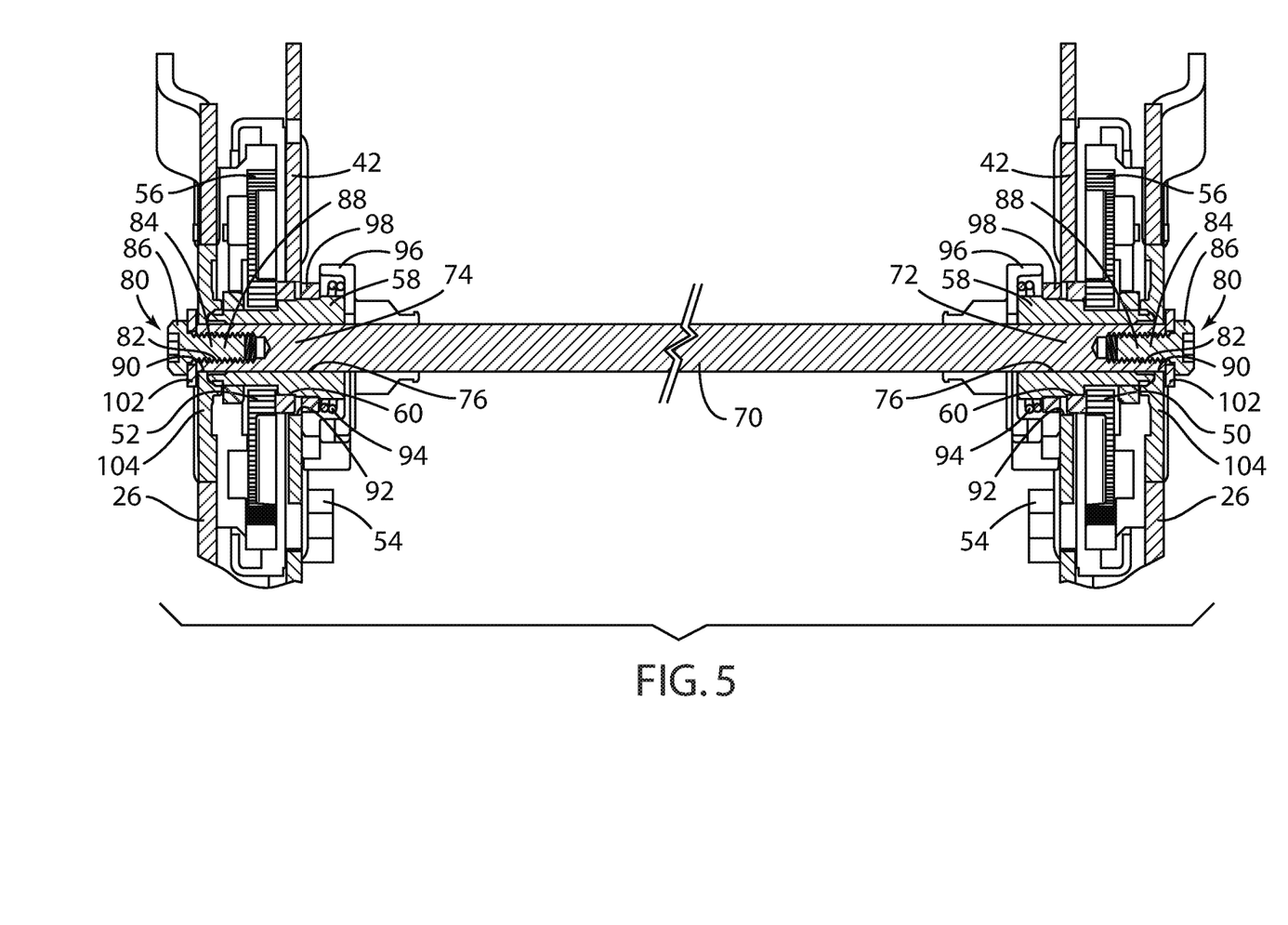
FIG. 5 is a front cross-sectional view of a portion of the seating assembly frame of a motor vehicle of FIG. 1 in accordance with the present disclosure.

The seatback 14 is shown upright in FIG. 1. The seatback 14 of the seating assembly frame 10 further comprises an inboard side 34 which is likewise spaced apart from an outboard side 36. An upper cross member 38 and a lower cross member 40 provide nominal lateral structural support. Each of the inboard side 34 and outboard side 36 of the seatback 14 of the seating assembly frame 10 has in upper bracket 42 extending downwardly that forms a first and a second seatback mount 44, 46, respectively. As shown, the upper bracket 42 likewise may be attached to the inboard side 34 or the outboard side 36 of the seatback 14 via fasteners or welding, as shown in FIG. 5. The seatback 14 may be pivotally attached to the first and second lower seating structure mounts 28, 30 of the lower seating structure 12 at the first and second seatback mounts 44, 46, respectively.

The first seatback mount 44 on the inboard side 34 of the seatback 14 may be pivotally attached to the first lower seating structure mount 28 via a first gear system 50. Similarly, the second seatback mount 46 on the outboard side 36 of the seatback 14 may be pivotally attached to the second lower seating structure mount 30 via a second gear system 52. Referring to FIG. 5, a non-limiting example of the pair of gear systems 50, 52 is shown. One of the pair of gear systems 52 is shown in further detail in FIG. 6. Each of the pair of gear systems 50, 52 is fixedly mounted to one of the pair of upwardly extending lower seating structure mounts 28, 30 or one of the pair of downwardly extending seatback mounts 44, 46 to operatively couple the seatback 14 to the lower seating structure 12 to rotate the seatback 14 relative to the lower seating structure 12, as further described herein.

In order to accomplish such rotation of the seatback 14 relative the lower seating structure 12, the pair of gear systems 50, 52 of the seating assembly frame 10 rotationally couples the seatback 14 with the lower seating structure 12. In the power reclining configuration shown in FIGS. 1-6, the seatback 14 utilizes a power reclining electric actuator 54 to drive the input gears 56 of each of the gear systems 50, 52 to recline the seatback 14. In the case of the power reclining configuration, preferably one of a pair of gear systems 50, 52 is disposed on either side of the seatback 14. Preferably, each of the pair of gear systems 50, 52 is fixedly coupled with the bottom bracket 26 extending upwardly from the lower seating structure 12. A recliner hub 58 is preferably received within an orifice 60 provided on each of the pair of gear systems 50, 52 on each side 18, 20 of the seatback 14 and is fixedly coupled with the upper bracket 42 depending downwardly from the seatback 14. Accordingly, simultaneous actuation of the pair of gear systems 50, 52 causes rotation of the recliner hub 58 relative the bottom bracket 26 of the lower seating structure 12 extending upwardly and causes the seatback 14 to pivot relative the lower seating structure 12 between its uppermost design position and its lowermost design position. In a manual reclining configuration, the seatback 14 of the present disclosure may utilize a manual rotating knob (not shown) to drive the input gears 56 of the pair of gear systems 50, 52 to recline the seatback 14.

As noted above, in the preferred embodiment, each of the pair of gear systems 50, 52 is preferably fixedly attached with one of the bottom brackets 26 on each of the inboard side 16 and outboard side 18 of the lower seating structure 12, as shown in FIGS. 1-6, while the recliner hub 58 is fixedly coupled with the upper bracket depending downwardly from the seatback 14. Alternatively, it should be understood that each of the pair of gear systems 50, 52 may be fixedly attached with one of the upper brackets 42 extending downwardly on each of the inboard side 34 or outboard side 36 of the seatback, while the recliner hub 58 may be fixedly coupled with the bottom bracket 26 depending upwardly on each of the inboard side 16 or outboard side 18 of the lower seating structure 12.

As shown in FIG. 1, the seatback 14 may include a seat belt shoulder harness mount 62 disposed at an outboard corner 64 of the outboard side of the seatback 14 within which the seatbelt assembly (not shown) may be mounted. Alternatively, a slidable attachment point (not shown) can be disposed at the outboard corner 64 of the outboard side of the seatback 14 for a shoulder belt of the seatbelt assembly, where the seatbelt assembly is mounted elsewhere in the occupant compartment of the motor vehicle proximate the seating assembly.

Thus, as noted above, during a frontal impact event, the outboard corner 64 of the seatback 14 may experience significant load and torque as the occupant of the motor vehicle is urged forward against the shoulder belt. However, in spite of such significant loading, particularly in the case of seating assembly frames 10 that are mounted in side-by-side relationship in the front seating row, the seatbacks 14 must remain in the same plane and remain parallel to each other. Further, the inboard side 34 and outboard side 36 of the seatback should remain in parallel, fixed, spaced-apart relation with one another. As an aspect of the present disclosure, it was determined that significant deformation was manifest as an increase in the spacing between the inboard side 34 and the outboard side 36 of the seatback 14 to an undesirable level. In previous designs, even where a cross tube or torque rod may have been present, such cross tubes or torque rods have not prevented the described deformations. That is, most cross tubes were hollow in order to minimize mass and overall motor vehicle curb weight. Further, often a push nut was used to prevent the cross tube or torque rod from traveling out of its design position. Alternatively, one end of the torque rod may not have been restrained at all. Thus, such configurations were insufficient to withstand the forces tending to separate the inboard side 34 and the outboard side 36 of the seatback 14 resulting from the lateral loading of the seatback 14 described above.

Figure 6:
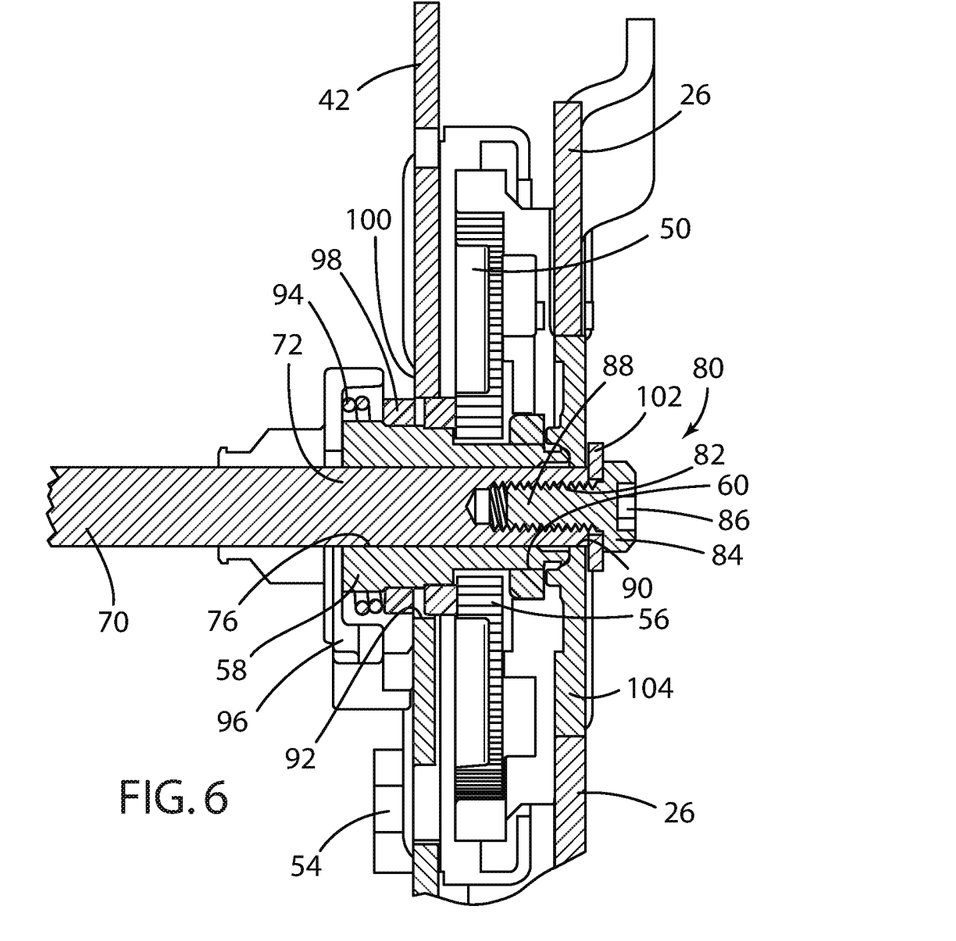
FIG. 6 is a front cross-sectional view of a portion of seating assembly frame of a motor vehicle of FIG. 1 in accordance with the present disclosure, taken along the line VI-VI shown in FIG. 3.

To maintain the inboard side and outboard side of the seatback in their design positions during the impact event, in accordance with the present disclosure, a dedicated robust tension reacting member 70 may be employed to maintain the inboard side 34 and outboard side 36 of the seatback 14 in their original design orientation during an impact event and to withstand the forces and torque applied to the seatback 14. In the most preferred embodiment, a solid metal rod is employed as the tension reacting member 70, and extends between the inboard side 34 and an outboard side 36 of the seatback 14. In order to improve strength and reliability, the solid metal rod 70 is preferably fabricated from high tensile strength steel and has a substantially continuous cross-sectional area. An inboard end 72 and an outboard end 74 of the solid metal rod 70 may be received within an opening 76 in each of the pair of the recliner hubs 58, the recliner hubs 58 being free to rotate relative the solid metal rod 70, as best shown in FIGS. 5 and 6. Although not shown, it is contemplated that a bushing can be disposed between each end 72, 74 of the solid metal rod 70 and the opening 76 in each of the pair of recliner hubs 58 so as to reduce friction, lower the torque necessary for actuation by the pair of gear systems 50, 52, and minimize wear.

A threaded fastener assembly 80 preferably operably couples each of the inboard end 72 and the outboard end 74 of the solid metal rod 70 to one of the bottom brackets 26 extending upwardly from each of the inboard side 16 and outboard side 18 of the lower seating structure 12. The fastener assembly 80 as well operably couples each of the inboard end 72 and the outboard end 74 of the solid metal rod 70 to one of the upper brackets 42 extending downwardly from each of the inboard side 34 and outboard side 36 of the seatback 14.

In the most preferred embodiment, and as shown in the FIGS. 1-6, the fastener assembly 80 comprises a threaded orifice 82 disposed at each end 72, 74 of the solid metal rod 70 and a threaded bolt 84 having a driven head 86 and a threaded shank 88 extending through an opening 90 in each of bottom brackets 26 on each of the inboard side 16 and the outboard side 18 of the lower seating structure 12 and an opening 92 in each of the upper brackets 42 on each of the inboard side 34 and the outboard side 36 of the seatback 14, wherein the threaded shank 88 is threadingly received within the threaded orifice 82. Preferably, a compression spring 94 may be provided within the recliner hub 58 on an inner portion 96 thereof to act against a bushing 98 disposed against an inner side 100 of each of the pair of the gear systems 50, 52. The bushing 98 is preferably fabricated from a wear-resistant material, such as nylon, that offers little resistive friction. During assembly, as the threaded bolt 84 is threaded into the threaded orifice 82 of each of the inboard end 72 and the outboard end 74 of the solid metal rod 70, the compression spring 94 is compressed until a desired torque on the threaded bolt 84 is obtained, thus providing a relatively fixed and known preload to the fastener assembly 80, which in turn provides a known and fixed torque required for rotation of the recliner hub 58 relative each of the pair of the gear systems 50, 52 that drives rotation of the recliner hub 58. It should be understood, however, that the fastener assembly 80 may alternatively comprise a threaded stud (not shown) disposed at each end of the solid metal rod 70 and extending through the openings 90, 92 in each of the inboard sides 16, 34 and the outboard sides 18, 36 of the lower seating structure 12 and seatback 14, respectively, and a threaded nut (not shown) threadingly coupled with the threaded stud.

In either case, whether the fastener assembly 80 comprises a bolt or a threaded stud, a loadbearing washer 102 may be employed through which the threaded bolt 84 or the threaded stud extends. The loadbearing washer 102, which is preferably twice the diameter of the threaded shank 88 of the threaded bolt 84, preferably may be brought to bear by the driven head 86 of the threaded bolt 84 (or nut) against an exposed portion 104 of each of the pair of gear systems 50, 52 that is fixedly mounted to the bottom bracket 26 that extends upwardly from the lower seating structure 12. In accordance with the fastener assembly 80 described above, the threaded fastener assembly 80 allows the pair of gear systems 50, 52 to rotate the downwardly extending upper brackets 42 of each of the inboard side 34 and outboard side 36 of the seatback 14 between a first raised design position and a second lowered design position.

As noted above, the seating assembly frame 10 may be provided in both power and manual configurations. Seating assembly frame 10, shown as a powered seat configuration in FIGS. 1-6, may include the pair of power reclining electric actuators 54 that selectively rotate the pair of gear systems 50, 52. The pair of gear systems 50, 52 may be configured to eccentrically pivot the seatback 14 through a range of angular positions.

The power reclining electric actuators 54 may be electrically connected to an input mechanism (not shown), such as a button. When a passenger operates the input mechanism, the power reclining electric actuators 54 are caused to simultaneously rotate each of the pair of gear systems 50, 52. Rotation of the gear systems 50, 52 cause the seatback 14, and more specifically, the first and second seatback mounts 44, 46, to pivot relative to the first and second lower seating structure mounts 28, 30, which remain fixed. Due to the eccentricity in each of the pair of gear systems 50, 52, the inboard side 34 and outboard side 36 of the seatback 14 may move vertically up and down as the pair of gear systems 50, 52 pivot the seatback 14 through a range of angular positions. In the manual configuration, the seating assembly frame 10 may implement an alternative input member, such as the knob or handle (not shown).

Accordingly, a non-limiting example operation of the seating assembly frame 10 may be described as follows. The power reclining electric actuators 54, or alternatively a knob (not shown), may actuate at least one of the pair of gear systems 50, 52, which in turn rotates the recliner hub 58 operably coupled with the upper bracket 42 depending downwardly from the inboard side 34 and outboard side 36 of the seatback 14. In turn, the seatback 14 is caused to pivot relative the lower seating structure 12 between its uppermost design position and its lowermost design position.

As noted above, reference has been made herein to the preferred use of the solid metal rod 70 as a passive cross member extending between and mechanically coupling the inboard side 34 and the outboard side 36 of the seatback 14, particularly in the context of a pair of gear systems 50, 52 being used, where one each of the pair of gear systems 50, 52 is mounted on each of the inboard side 16 and outboard side 18 of the lower seating structure 12, respectively. It should be noted, however, that in the event that a single gear system is employed on only one side of the seating assembly frame 10, a splined torque rod may extend across the seating assembly frame 10 to engage an eccentric pivot on the side opposite that provided with the single gear system, as disclosed in U.S. Pat. No. 8,434,823, the entirety of which is hereby incorporated by reference. In such an event, it is contemplated that the splined torque rod and gear systems disclosed therein can be redesigned and modified to act as the tension reacting member 70, in cooperation with the recliner hub 58 and fastener assembly 80 disclosed herein, and in accordance with the teachings further disclosed herein. In such an assembly, it is contemplated that the fastener assembly 80 disclosed herein may be applied to operably couple each end of the splined torque rod to each of the inboard side 16 and the outboard side 18 of the lower seating structure 12 and the inboard side 34 and the outboard side 36 of the seatback 14, respectively, as disclosed herein.

In accordance with the disclosure set forth above, the tension reacting member 70 may be applied to withstand the forces applied to the outboard corner 64 of the seatback 14, while also avoiding the need for an overall redesign of the seating assembly frame 10 or the need to increase the mass of the structural components of the seating assembly frame 10 to resist such forces.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) and the term quote connected" (in all of its forms, connect, connecting, connected, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "operably coupled" and "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A seat assembly comprising:
   a lower seat;
   a seatback pivotally coupled to the lower seat;
   a gear system operatively coupling the seatback to the lower seat to rotate the seatback relative to the lower seat;
   a tension reacting member extending between a first side and a second side of the seatback, the tension reacting member comprising a solid metal rod integrally formed as a single piece of material with threaded features on either end to engage a pair of respective fastener assemblies, respectively, wherein the solid metal rod has a constant cross-sectional area along an entire length from the threaded features on one end to the threaded features on the opposite end of the solid metal rod; and
   wherein the pair of fastener assemblies each operably couple the tension reacting member to each of the first side and the second side of the seatback, respectively.

2. The seat assembly of claim 1, wherein the threaded features of the solid metal rod comprise a threaded orifice disposed at each end of the solid metal rod and the pair of fastener assemblies comprise one of a pair of threaded bolts extending through an opening in each of the first side and the second side of the seatback and threadingly received within a respective threaded orifice.

3. The seat assembly of claim 1, wherein the threaded features of the solid metal rod comprise a threaded stud disposed at and extending from each end of the solid metal rod and extending through one of a pair of openings in each of the first side and the second side of the seatback and the pair of fastener assemblies each comprise a threaded nut operatively coupled with a respective threaded stud.

4. The seat assembly of claim 1, wherein the pair of fastener assemblies further comprise a bolt or a threaded stud extending through an opening in each of the first side and the second side of the seatback and a loadbearing washer through which the bolt or the threaded stud extends.

5. The seat assembly of claim 1, wherein the lower seat comprises a first side and a second side, the first side of the lower seat being spaced apart from the second side of the lower seat, and each of the first side and the second side of the lower seat further comprises an upwardly extending mounting bracket.

6. The seat assembly of claim 5, wherein the first side of the seatback is spaced apart from the second side of the seatback, and each of the first side and the second side of the seatback further comprises a downwardly extending mounting bracket.

7. The seat assembly of claim 1, wherein an actuator is coupled to the gear system to move the seatback between a plurality of angular positions.

8. A seat assembly frame comprising:
   a lower seat comprising a first side and a second side, the first side of the lower seat being spaced apart from the second side of the lower seat, and each of the first side and the second side of the lower seat further comprises an upwardly extending mounting bracket;
   a seatback pivotally and operably coupled to the lower seat and comprising a first side and second side, the first side of the seatback being spaced apart from the second side of the seatback, and each of the first side and the second side of the seatback further comprises a downwardly extending mounting bracket;
   a gear system fixedly mounted to one of the upwardly extending mounting brackets or one of the downwardly extending mounting brackets to operatively couple the seatback to the lower seat to rotate the seatback relative to the lower seat;
   a solid metal rod extending between the first side and the second side of the seatback, the solid metal rod having a first end and a second end, wherein the solid metal rod is integrally formed as a single piece of material with threaded features on either end to engage a pair of respective fastener assemblies, respectively, that operably couple each of the first end and the second end of the solid metal rod to the upwardly extending mounting bracket of the first side and the second side of the lower seat, respectively, wherein the solid metal rod comprises a constant cross-sectional area that extends along an entire length from the threaded features on one end to the threaded features on the opposite end of the solid metal rod; and
   a compression spring disposed between the first side and the second side of the seatback and each of the pair of fastener assemblies, respectfully, whereby a predetermined preload torque to the fastener assemblies is obtained, which in turn provides a predetermined torque required for rotation of the seatback relative the gear system.

9. The seat assembly frame of claim 8, further comprising a recliner hub operably coupled with the gear system, wherein the gear system is fixedly mounted to one of the downwardly extending mounting brackets of the seatback.

10. The seat assembly frame of claim 8, further comprising a recliner hub operably coupled with the gear system, wherein the gear system is fixedly mounted to one of the upwardly extending mounting brackets of lower seating structure.

11. The seat assembly frame of claim 8, wherein the gear system comprises a pair of gear systems, each gear system operably coupled with one of the first side or second side of the seatback.

12. The seat assembly frame of claim 8, wherein the gear system comprises a pair of gear systems, each gear system operably coupled with one of the first side or second side of the lower seat.

13. A reclining seat assembly comprising:
- a lower seating structure having a first side and a second side;
- a seatback pivotally affixed to the lower seating structure, the seatback having a first side and a second side wherein the first side is spaced apart from the second side;
- a gear system operatively coupling the first side or the second side of the seatback to the corresponding first side or the second side of the lower seating structure, the gear system operatively configured to rotate the seatback relative to the lower seating structure;
- an actuator coupled to the gear system to move the seatback between a plurality of angular positions; and
- a tension reacting member extending between the first side and the second side of the seatback, the tension reacting member having a first end and a second end, wherein the tension reacting member is integrally formed as a single piece of material with threaded features on either end to engage a pair of respective threaded fastener assemblies, respectively, wherein the tension reacting member comprises a constant cross-sectional area that extends along an entire length from the threaded features on one end to the threaded features on the opposite end of the tension reacting member;
- wherein the pair of threaded fastener assemblies operably couple each of the first end and the second end of the tension reacting member to one of the first side and the second side of the seatback, and wherein the pair of threaded fastener assemblies allow the gear system to rotate the seatback between a first raised position and a second lowered position.

14. The reclining seat assembly of claim 13, wherein the tension reacting member comprises a solid metal rod and at least one of the first end or the second end of the solid metal rod is operatively coupled with the gear system.

15. The reclining seat assembly of claim 14, wherein the solid metal rod further comprises a splined torque rod extending across the reclining seat assembly and engaging an eccentric pivot on the side opposite the side operably coupled with the gear system.

16. The reclining seat assembly of claim 13, wherein the tension reacting member comprises a solid metal rod and the threaded features of the tension reacting member comprise a threaded orifice disposed at each end of the solid metal rod and the pair of threaded fastener assemblies comprise a threaded bolt extending through an opening in each of the first side and the second side of the seatback and threadingly received within a respective threaded orifice.

17. The reclining seat assembly of claim 13, wherein the tension reacting member comprises a solid metal rod and the threaded features of the tension reacting member comprise a threaded stud disposed at and extending from each end of the solid metal rod and extending through an opening in each of the first side and the second side of the seatback and the pair of threaded fastener assemblies comprise a threaded nut operatively coupled with a respective threaded stud.

18. The reclining seat assembly of claim 13, further comprising a compression spring disposed between the first side and the second side of the seatback and each of the pair of fastener assemblies, respectfully, whereby a predetermined preload torque to the fastener assemblies is obtained, which in turn provides a predetermined torque required for rotation of the seatback relative the gear system, and wherein the pair of threaded fastener assemblies further comprise a bolt or a threaded stud extending through an opening in each of the first side and the second side of the seatback and a loadbearing washer through which the bolt or the threaded stud extends.

* * * * *